June 29, 1926. Re. 16,369
G. K. GILLETTE
BRAKE OR CLUTCH BAND LINING
Original Filed July 5, 1922
Fig. 5,
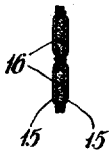
Fig. 4,
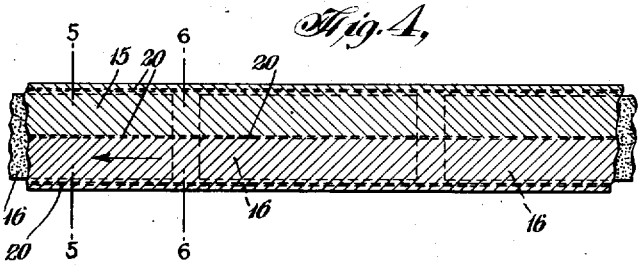
Fig. 6,
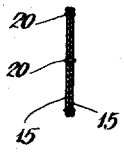
Fig. 2,
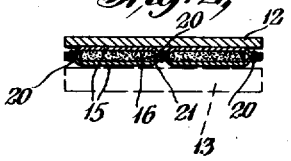
Fig. 3,
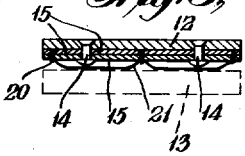
Fig. 1,
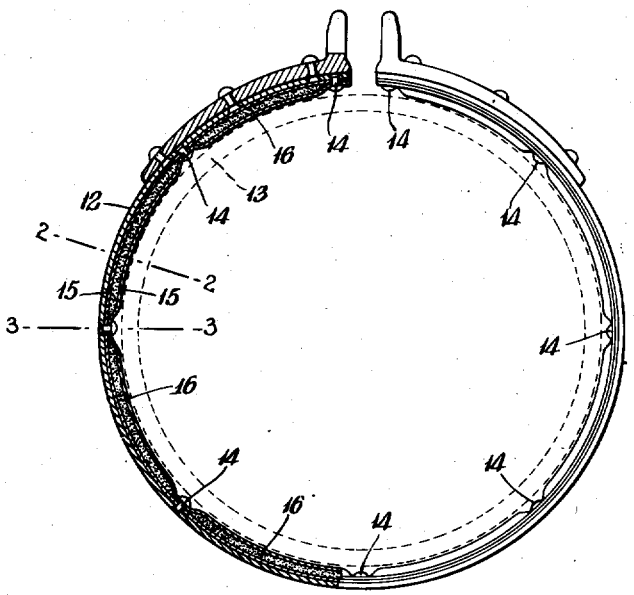
Fig. 7,
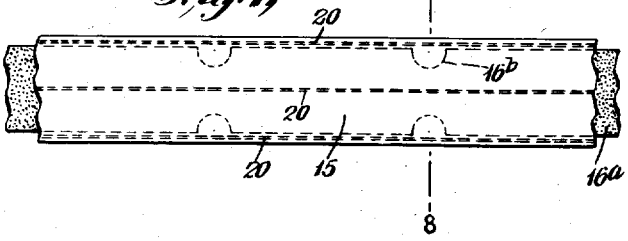
Fig. 8,
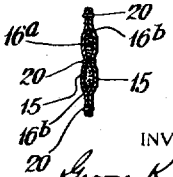
INVENTOR
George K. Gillette
BY
Kiddle and Marquson
ATTORNEYS Patented June 29, 1926.

Re. 16,369

UNITED STATES PATENT OFFICE.

GEORGE K. GILLETTE, OF PEMBROKE, MASSACHUSETTS.

BRAKE OR CLUTCH BAND LINING.

Original No. 1,492,028, dated April 29, 1924, Serial No. 573,021, filed July 5, 1922. Application for reissue filed April 27, 1926. Serial No. 105,036.

This invention relates particularly to a lining or inner facing of compressible material, adapted to be riveted to a resilient compressible metal band which is compressed or closed by means provided for that purpose on a rotating drum, forming an element of a gear transmission, such as is used on motor vehicles, the lining being pressed against the drum by the closing of the band. The band and lining usually run in a casing containing oil.

The chief object of the invention is to provide a band lining or facing, adapted to absorb and accumulate a considerable quantity of oil when the band is loose, so that when the band is closed a sufficient quantity of oil will be carried by the inner surface of the lining, i. e., the surface which engages the rotating drum, for proper lubrication.

Other objects will appear hereinafter.

The invention is embodied in the improvements hereinafter described and claimed.

Of the accompanying drawings forming a part of this specification,—

Figure 1 is an edge view of a band provided with a lining embodying the invention, parts of the band and lining being shown in section.

Figure 2 is a section on line 2—2 of Figure 1.

Figure 3 is a section on line 3—3 of Figure 1.

Figure 4 is a fragmentary side view showing a portion of the lining.

Figure 5 is a section on line 5—5 of Figure 4.

Figure 6 is a section on line 6—6 of Figure 4.

Figure 7 is a view similar to Figure 4 showing a modification.

Figure 8 is a section on line 8—8 of Figure 7.

The same reference characters indicate the same parts in all of the figures.

In the drawings, 12 represents a resilient metal band, adapted to nearly surround a rotating drum 13, and to be closed thereon by well known means, not shown, the band being normally open, so that the lining hereinafter described is out of binding contact with the drum.

My improved lining is a flexible strip, practically co-extensive in length and width with the band, and attached to the latter by rivets 14. The lining includes outer and inner casing levers 15, extending uninterruptedly the entire length of the lining, and composed of any suitable non-metallic material, the inner layer being of absorbent material, so that oil can pass freely through it. The outer layer is preferably of the same material. A suitable material for each layer is textile fabric, such as woven webbing having salvage edges, the width of the webbing being that desired for the lining.

Between the casing layers 15 is interposed an intermediate cushioning layer, composed of sections 16 of any suitable compressible absorbent material, such as ground cork and a binder, formed into a sheet from which the sections 16 may be cut. I have used with satisfactory results cushioning layers composed mainly of a mixture of ground cork and linseed oil, such as that used in the manufacture of linoleum.

The sections 16 are arranged in tandem order. Their adjacent ends are spaced apart, and the outer ends of the terminal layers are spaced from the ends of the casing layers 15, so that the casing layers meet between the sections and at the ends of the lining, and form relatively thin portions, adapted to receive the rivets 14. The heads of the rivets are therefore offset from the face portions of the inner casing layer, which are backed by the cushioning layer sections, so that the rivets are prevented from contacting with and injuring the drum 13.

The casing layers 15 are united to form a sheath, enclosing and confining the sections 16, by suitable fastenings such as longitudinal rows of stitches 20, of strong thread. Three rows are preferably provided, as shown by Figures 2 to 6. The stitches of the outer rows unite the casing layers 15, outside the sections. The stitches of the intermediate row pass through the cushioning absorbent sections, as shown by Figure 2. The thread is under such tension when the stitches are formed, that the casing layers are caused to sink into the cushioning absorbent layer sections, the latter being compressed at their longitudinal central portions. A longitudinal channel 21 is thus formed between the outer edges and in the inner side of the lining, in which oil accumulates, when the band is separated from the drum, the accumulated oil being squeezed out and flowing toward the outer edges when the band is closed on the drum.

The webbing of which the inner casing layer 15 is made, is preferably "herring bone" woven, so that it presents angular surface ridges extending across the layer and obliquely in opposite directions from the longitudinal center to the edges of the lining, as indicated by the oblique shade lines in Figure 4. The ridges form oblique lateral channels, communicating with the longitudinal channel 21, and adapted to conduct oil from the latter to the edges of the lining when the band is closed on the drum. The oblique arrangement of these lateral channels causes the rotation of the drum to draw oil through the channels, the rotation of the drum being in the direction indicated by the arrow in Figure 4.

It will now be seen that the entire lining is of absorbent material so that it absorbs oil when the band is not in use, and gives out the oil when the lining is pressed against the drum by the closing of the band. The channel 21 is also adapted to contain a considerable quantity of oil and give the same out when the lining is closed on the drum. The cushioning sections entirely enclosed between the casing layers are not exposed to contact with the drum, the inner surface of the lining contacting with the drum being homogeneous, and formed entirely by the inner casing layer, which is interposed between the cushioning material and the drum. The lining is therefore more durable than would be the case if the cushioning material were composed of inserts, or sections forming portions of the inner surface of the lining, and contacting with the drum. Moreover, the entirely encased cushioning material, protected by the inner casing layer against frictional wear, need not necessarily have the wear-resisting quality which would be necessary if it were exposed to contact with the drum.

The cushioning layer sections may be made of any material having sufficient compressibility and absorptiveness. For example, said section may be strips of Brussels or other pile carpeting, arranged with the pile side in contact with the inner casing layer. Wool felt may be employed if desired.

The modification shown by Figures 7 and 8 comprises a one piece cushion 16[a] which may extend nearly the entire length of the lining, and is provided with notches or recesses 16[b] in its opposite edges, permitting the casing layers to meet at intervals and form relatively thin rivet-receiving portions, the area of which is such that rivet heads may be seated thereon, and spaced from the drum when the band is closed.

I claim:

1. A compressible lining for a brake or clutch drum band, said lining including outer and inner layers of textile fabric and having a homogeneous inner surface, and a central longitudinal channel in said inner surface in which oil accumulates when the lining is separated from the drum, and from which the accumulated oil is pressed toward the edges of the lining when the latter is closed on the drum.

2. A compressible lining for a brake or clutch drum band, said lining including outer and inner layers of textile fabric, an intermediate cushioning layer of greater compressibility than the outer and inner layers and fastening means connecting said layers, the inner layer forming a homogeneous lining surface, and the said fastening means including a longitudinal row of stitches, located midway between the longitudinal edges of the lining and pressing a portion of the inner layer into the cushioning layer to form a central longitudinal channel in said inner surface in which oil accumulates when the lining is separated from the drum, and from which the accumulated oil is pressed toward the edges of the lining when the latter is closed on the drum.

3. A brake or clutch band lining substantially as specified by claim 1, the said inner layer being composed of herring bone woven textile fabric, presenting angular surface ridges extending across said layer and obliquely in opposite directions from the longitudinal center to the edges thereof, said ridges forming oblique oil-conducting channels.

4. A lining for a clutch drum band, comprising a layer of absorbent material adapted to absorb oil and an adjacent layer of material adapted to permit the passage of said oil therethrough.

5. A lining for a clutch drum band, said lining including an outer layer, an intermediate absorbent layer for taking up oil when the lining is separated from the drum, and an inner absorbent layer through which the oil, taken up by the absorbent intermediate layer, is pressed when the lining is closed on the drum.

6. A lining for a clutch drum band, comprising an outer layer and an inner layer, the said inner layer being composed of woven textile fabric having ridges on one face of said layer, said ridges extending obliquely in opposite directions and providing grooves or channels on the face of the lining.

7. A lining for a clutch drum band, comprising a plurality of layers, the face of one of said layers having grooves or channels woven therein to provide oil-retaining grooves or channels on the face of the lining.

8. A lining for a clutch drum band, comprising a plurality of layers, the face of one of said layers having grooves or channels therein extending angularly to the longitudinal axis of said layer to provide oil-retaining grooves or channels on the face of the lining.

In testimony whereof, I have affixed my signature hereto.

GEORGE K. GILLETTE.